United States Patent [19]
Swanson et al.

[11] Patent Number: 6,070,606
[45] Date of Patent: Jun. 6, 2000

[54] METHOD OF ATTACHING SUPPLY CONDUIT TO A SOLENOID OPERATED VALVE

[75] Inventors: Wesley S. Swanson, Elk Grove Village; Robert J. Cooper, Fox Lake, both of Ill.

[73] Assignee: Ranco Incorporated of Delaware, Wilmington, Del.

[21] Appl. No.: 08/895,073

[22] Filed: Jul. 16, 1997

[51] Int. Cl.[7] .................................................. F16K 51/00
[52] U.S. Cl. .............................. 137/15; 251/148; 228/2.3
[58] Field of Search ........................... 251/148; 228/2.3; 137/15

[56] References Cited

U.S. PATENT DOCUMENTS

| | | | |
|---|---|---|---|
| 3,357,678 | 12/1967 | Dyki | 251/148 |
| 3,396,848 | 8/1968 | Kozel | 251/148 |
| 4,911,406 | 3/1990 | Attwood | 251/148 |
| 5,110,157 | 5/1992 | Chen | 251/148 |
| 5,197,711 | 3/1993 | Geiger et al. | 251/148 |
| 5,333,467 | 8/1994 | Pearl, II et al. | 251/148 |
| 5,555,909 | 9/1996 | Elliot | 251/148 |
| 5,558,265 | 9/1996 | Fix, Jr. | 228/2.3 |
| 5,566,708 | 10/1996 | Hobbs, Jr. | 251/148 |
| 5,655,750 | 8/1997 | Smock et al. | 251/148 |

*Primary Examiner*—A. Michael Chambers
*Assistant Examiner*—Thomas L. McShane
*Attorney, Agent, or Firm*—Terrence Martin; Jules J. Morris; Sean D. Detweiler

[57] ABSTRACT

A method of non-releasably quick-connecting a tubular metal conduit to the inlet of a non-metallic valve body. A closure having a tube-receiving bore is then pre-assembled with a frictionally engaging spring washer and seal rings therein and is then secured to the valve inlet preferably by non-metallic weldment. The tubular conduit is then inserted into the bore and radially compresses the seal rings and is frictionally engages the spring washer to prevent subsequent removal of the conduit.

20 Claims, 1 Drawing Sheet

METHOD OF ATTACHING SUPPLY CONDUIT TO A SOLENOID OPERATED VALVE

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

The present invention relates to the attachment of a supply conduit to the inlet of a valve and particularly relates to solenoid operated valves employed for controlling the flow of water where the body or main structure of the valve is formed of non-metallic material to provide electrical isolation of the solenoid from the conduit to protect the user from the hazards of electrical shock.

Solenoid operated valves are commonly employed in household appliances such as, for example, clothes washing machines, dishwashers and ice makers for refrigerators. Appliance water valves of this type are therefore typically connected to a household power supply either 240 Volt or 117 Volts AC which is a high enough voltage to create a hazardous condition for the appliance user in the event of contact occurs with the electrical solenoid operator and the water supply. In order to reduce the hazards of electrical shock, typical appliance water inlet valves have the body thereof molded from plastic material and the coil typically encapsulated with plastic material for reducing the likelihood of occurrence of electrical shock.

Appliance water inlet valves are, in many installations, connected to a flexible conduit by either a threaded hose-type connection or by compression type tubing connection in the case of small diameter bendable or deformable metal tubing as the supply conduit.

In certain applications, as for example in refrigerator ice makers located in the refrigerator freezer compartment, it is desired to provide for assembly of a portion of the supply conduit internal to the refrigerator during the manufacture of the refrigerator in order that the user may make the waterline connection to the icemaker externally of the refrigerator cabinet. Such an arrangement must necessarily be accomplished in a manner which is simple and easy to install and which is relatively low in manufacturing costs to be competitive in high volume mass production of such household appliances.

BRIEF SUMMARY OF THE INVENTION

It is an object of the present invention to provide for a non-releasable quick-connect of a tubular metal conduit to the inlet of a non-metallic valve body without fittings, fasteners or tools.

The present invention provides a technique for connecting a flexible metal conduit to the inlet of a solenoid operated water valve of the type having a non-metallic body in a manner which permits the conduit to be inserted in the inlet and secured and sealed therein without the aid of separate fittings, fasteners or tools. The water valve conduit connection of the present invention is characterized as a non-removable quick-connect. The conduit connection of the present invention is particularly suitable for connecting bendable or deformable metal conduit to the inlet of a solenoid operated water valve employed in a refrigerator ice maker where it is desired to connect a supply conduit to the water valve at installation of the ice maker during manufacture of the refrigerator with the portion of the conduit extending externally of the refrigerator cabinet and adapted for user connection thereto externally of the refrigerator.

The quick-connect method of the present invention permits the connection of a tubular flexible metal conduit to the water valve inlet without the need of compression fittings, threaded connections or any tools. During installation of the icemaker in the freezer compartment, the installer need only manually insert the end of the tubing into the valve aperture in the valve inlet and push the tubing sufficiently inward to engage a pair of seal rings and subsequentially frictionally engage a spring member to retain the conduit sealed into the valve inlet in a non-removable manner.

DETAILED DESCRIPTION OF THE INVENTION

Figure 1:
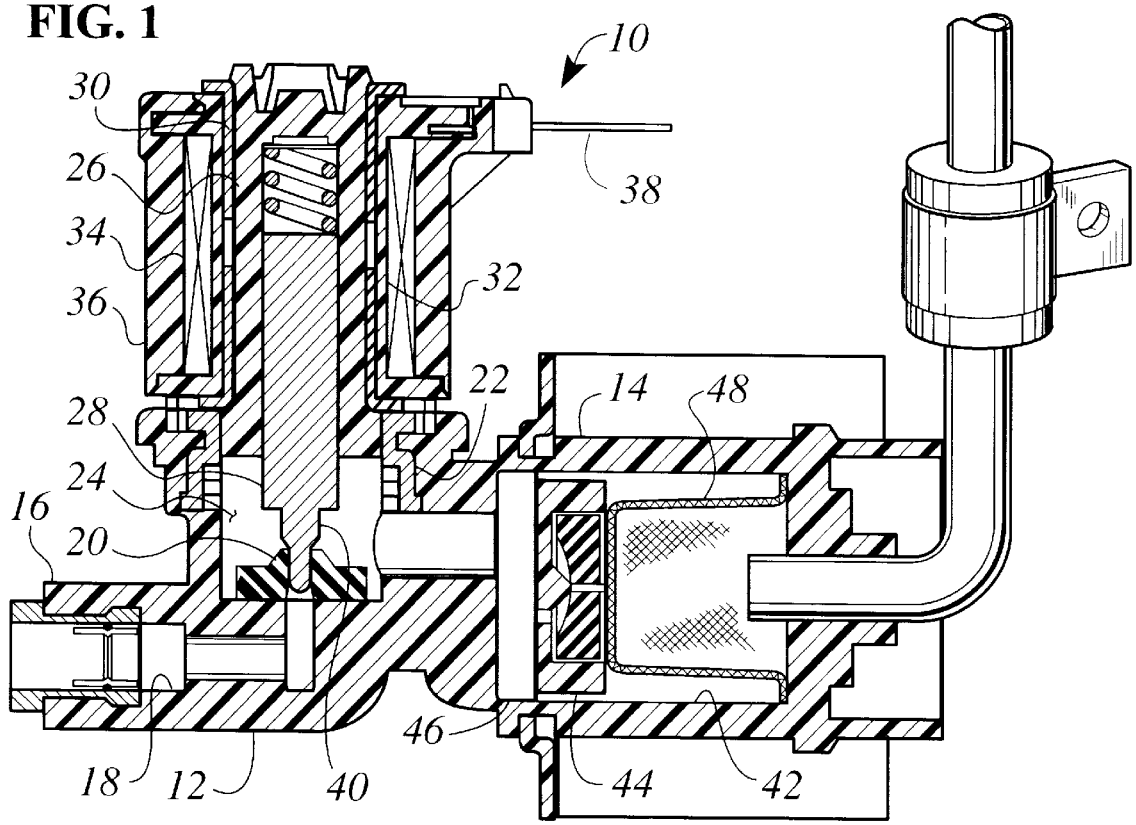
FIG. 1 is a cross sectional view of a non-metallic valve with a metal conduit quickconverted to the inlet according to the present invention.

Referring to FIG. 1, a valve assembly indicated generally at 10 has a molded plastic valve body 12 having an inlet end portion 14 and an outlet 16 with an outlet passage 18 having a valve seat 20 formed therein and an inlet passage 22 communicating with a valving chamber 24.

Valving chamber 24 is closed by a guide member 26 secired to body 12 and which has slidably received therein a ferromagnetic armature 28. The guide member 26 is surrounded by axially spaced tubular pole pieces 30, 32 which are surrounded by a coil 34 encapsulated with suitable plastic material 36 and having at least one electrical connector terminal 38 extending therefrom.

The armature 28 has a valving surface 40 thereon for contacting valve seat 20 to block flow from inlet passage 22 to the outlet passage 18. Upon energization of the coil 34 by flow of electrical current through the at least one terminal 38, the electromagnetic field created by current flow in coil 34 effects lifting of the armature 28 and valving surface 40 from valve seat 20 thereby permitting flow from inlet passage 22 to the outlet passage 18.

The inlet end portion 14 of the body 12 includes a chamber 42 which communicates with inlet passage 22 and which chamber has received therein a flow control washer 44 and retaining capsule 46 therefor. The chamber 42 also includes a generally cup-shaped filter screen 48.

Figure 2:
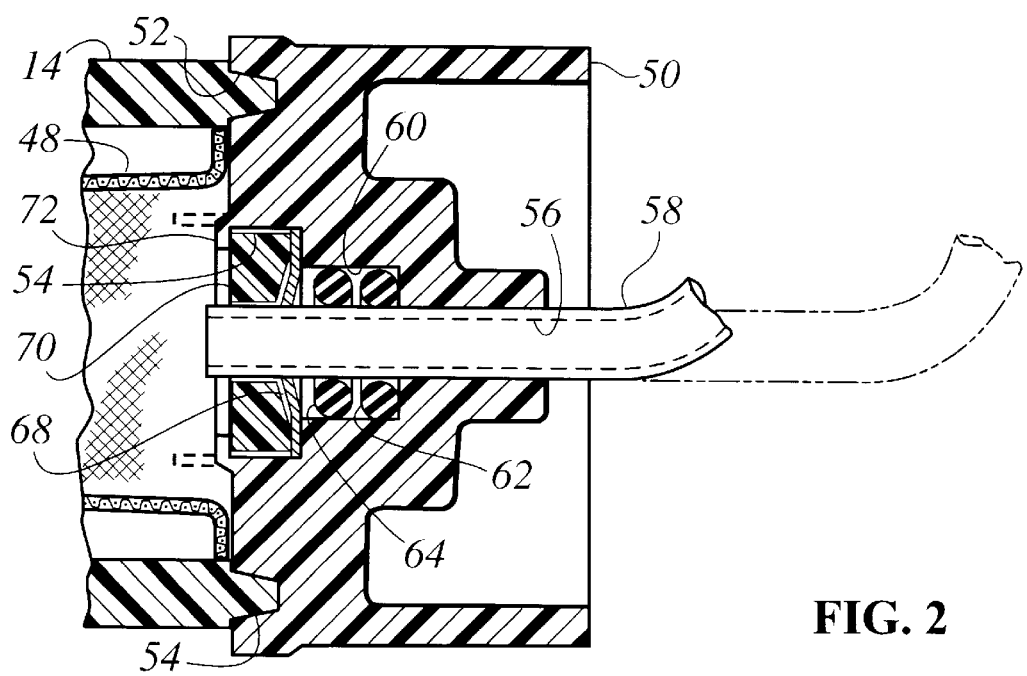
FIG. 2 is an enlarged view of a portion of FIG. 1.

Referring to FIGS. 1 and 2, chamber 42 in the inlet portion 14 of the valve body 12 is closed by a cap member 50 which has an annular groove 52 formed therein which is received over a tapered annular rib 54 formed on the rim of the inlet portion 14 of the valve body and secured thereto by weldment, as for example friction welding by spinning or by ultrasonic welding.

The closure cap 50 has a bore 56 received therethrough which is sized and configured to have slidably received therein one end of a flexible tubular metal supply conduit 58. The interior face of closure 50 has formed therein a counterbore 60 which has received therein a pair of resilient seals in the form of O-rings 62, 64 which are radially compressed upon insertion of the tube 58 in bore 56.

A second counterbore of a larger diameter and denoted by reference numeral 66 is formed in the face of closure 50 and has received therein a deflectable metal spring member 68 which may have an annular configuration and may have a plurality of radially inwardly extending fingers formed thereon. Spring member 68 is retained in the counterbore 66 by a backing member or washer 70 which is secured by deformation of the material of closure 50 as, for example, the annular rib 72 formed about counterbore 66. Rib 72 is deformed from the position shown in dashed outline to the position shown in solid outline in FIG. 2.

Upon insertion of the end of the tube 58 into the bore 56, the end of the tube initially contacts and compresses the seal rings 62, 64; and, upon continued further insertion engages the inner periphery of the spring member 68 in frictional engagement. Conduit or tube 58 is thus secured in the bore 56 by the frictional engagement of the inner periphery of member 68 with the periphery of the tube 58 and prevents withdrawal of the tube thereafter.

The present invention thus provides a unique method for quick-connecting a tubular metal conduit to the inlet of a valve and particularly an electrically operated valve having a non-metallic body without the aid of separate fittings, fasteners or tools in a manner which is simple and low in cost. The quick-connect of the present invention is intended for installations where the conduit is not removable after connection to the valve inlet. The non-removable quick-connect of the present invention is particularly suitable for electrically operated appliance water inlet valves such as those employed in a refrigerator ice maker application.

Although the invention has hereinabove been described with respect to the illustrated embodiments, it will be understood that the invention is capable of modification and variation and is limited only by the following claims.

We claim:

1. A method of connecting a conduit to the inlet of a valve body comprising:
   (a) forming an annular recess in the inlet and disposing an annular support member in said recess;
   (b) disposing an annular gripping member adjacent said support member;
   (c) providing an annular closure member and disposing a resilient annular seal therein;
   (d) securing said annular closure member over the inlet and positioning and retaining said annular seal adjacent said gripping member; and
   (e) secondly inserting a tubular conduit progressively through said annular closure member, said annular seal member, said gripping member and said annular support member and frictionally engaging said conduit with said gripping member and permanently or non-releasably securing said conduit in said inlet and sealing about said conduit with said annular seal.

2. The method defined in claim 1, wherein said step of securing said closure member includes welding said closure to said body.

3. The method defined in claim 1, wherein said step of sealing about said conduit includes radially deforming said annular seals.

4. The method defined in claim 1, wherein said step of securing said closure member includes friction welding.

5. The method defined in claim 1, wherein said step of disposing an annular seal includes disposing a pair of annular seals in side by side relationship.

6. The method defined in claim 1, wherein said steps of forming an annular recess in said body inlet and providing an annular closure member includes molding plastic material.

7. A valve and supply conduit assembly comprising:
   (a) a valve body having an inlet with an annular recess therein with an annular support member received in said recess;
   (b) an annular gripping member disposed adjacent said support member;
   (c) an annular closure member received over said inlet having an annular seal member retain therein, said closure member sealingly secured to said body; and,
   (d) a tubular supply conduit having an end portion thereof inserted in said annular closure after same is secured to said body and engaging said gripping member, said annular seal member sealing about the surface of said conduit wherein said gripping member prevents removal of said conduit once inserted.

8. The assembly defined in claim 7, wherein said body and said closure are formed of plastic material with said closure secured by weldment.

9. The assembly defined in claim 7, wherein said end portion of said conduit has a generally straight cylindrical configuration.

10. The assembly defined in claim 7, wherein said seal includes a pair of elastomeric O-rings.

11. The assembly defined in claim 7, wherein said gripping member has a truncated conical configuration.

12. An apparatus for permanently or non-releasably securing a tubular conduit therein, comprising:
   a cap member having an inlet face and an outlet face, said cap member defining a bore therethrough adapted to accommodate the tubular conduit therein, and wherein said outlet face defines a first counterbore of a first diameter and a second counterbore of a second diameter, said second diameter being larger than said first diameter;
   at least one resilient seal positioned in said first counterbore;
   a deflectable spring member having an annular configuration and a plurality of radially inwardly extending fingers formed thereon positioned in said second counterbore;
   a backing member securably positioned in said second counterbore outwardly of said spring member, said backing member retaining said spring member in said second counterbore thereby.

13. The apparatus of claim 12, wherein said cap member includes an annular rib formed about said second counterbore, and wherein said backing member is securably positioned in said second counterbore by deformation of said annular rib.

14. The apparatus of claim 12, wherein said cap member further defines an annular groove in said outlet face configured to accommodate attachment to a valve body.

15. The apparatus of claim 12, further comprising at least two resilient seals positioned in said first counterbore.

16. The apparatus of claim 15, wherein each of said resilient seals are sized to compressably engage the tubular conduit.

17. The apparatus of claim 12, wherein said spring member is metal.

18. The apparatus of claim 12, wherein said backing member is a washer.

19. The apparatus of claim 12, wherein said backing member includes a profiled spring member engaging surface adapted to accommodate axial deflection of said fingers of said spring member upon insertion of the conduit.

20. The apparatus of claim 12, wherein said fingers extend radially inward to prevent removal of the conduit once inserted therethrough.

* * * * *